United States Patent
Wells et al.

(10) Patent No.: US 12,293,427 B2
(45) Date of Patent: May 6, 2025

(54) MICRO-MOBILITY VEHICLE STATUS COMPLIANCE DETERMINATION

(71) Applicant: Uber Technologies, Inc., San Francisco, CA (US)

(72) Inventors: Alan Hugh Wells, Sausalito, CA (US); Gregory Mark Mahowald, Broomfield, CO (US); Lucie Zikova, San Francisco, CA (US); Aaron Matthew Rogan, Westminster, CO (US)

(73) Assignee: Uber Technologies, Inc., San Francisco, CA (US)

( * ) Notice: Subject to any disclaimer, the term of this patent is extended or adjusted under 35 U.S.C. 154(b) by 615 days.

(21) Appl. No.: 16/775,992

(22) Filed: Jan. 29, 2020

(65) Prior Publication Data
US 2021/0233198 A1  Jul. 29, 2021

(51) Int. Cl.
*G06Q 50/40* (2024.01)
*G06F 16/29* (2019.01)
(Continued)

(52) U.S. Cl.
CPC ............. *G06Q 50/40* (2024.01); *G06F 16/29* (2019.01); *G06Q 30/018* (2013.01); *H04W 4/48* (2018.02); *G01S 19/45* (2013.01); *G06Q 2240/00* (2013.01)

(58) Field of Classification Search
CPC .. G06Q 50/40; G06Q 30/018; G06Q 2240/00; H04W 4/48; G06F 15/29
(Continued)

(56) References Cited

U.S. PATENT DOCUMENTS

| 9,229,623 | B1 * | 1/2016 | Penilla | G06F 9/451 |
| 2011/0254655 | A1 * | 10/2011 | Maalouf | G09B 19/167 |
| | | | | 340/3.1 |
| 2017/0024945 | A1 * | 1/2017 | Shalev | G07C 9/27 |

FOREIGN PATENT DOCUMENTS

| CA | 3078655 A1 * | 3/2019 | B60L 53/36 |
| CA | 3033612 A1 * | 8/2020 | B64G 1/244 |

(Continued)

OTHER PUBLICATIONS

Paterakis, Nikolaos G., and Madeleine Gibescu. "A Methodology to Generate Power Profiles of Electric Vehicle Parking Lots under Different Operational Strategies." Applied energy 173 (2016): 111-123. Web. (Year: 2016).*

*Primary Examiner* — Akiba K Robinson
(74) *Attorney, Agent, or Firm* — Fenwick & West LLP

(57) ABSTRACT

Systems and methods are disclosed herein for detecting non-compliant use of a micro-mobility vehicle, for example, based on parking the micro-mobility vehicle outside of a designated area. In an embodiment, a processor detects that a micro-mobility vehicle shared by a plurality of users has transitioned from an operational state to a parked state, where the micro-mobility vehicle was operated by a user of the plurality of users when in the operational state. The processor determines a location of the micro-mobility vehicle while the micro-mobility vehicle is in the parked state, and evaluates whether it is permissible to transition the micro-mobility vehicle to the parked state at the location. Responsive to determining that it is not permissible to transition to the parked state at the location, the processor updates a profile of the user to indicate non-compliant use of the micro-mobility vehicle.

20 Claims, 6 Drawing Sheets

500

502 — Detect that a micro-mobility vehicle shared by a pluraliy of users has transitioned from an operational state to a parked state, where the micro-mobility vehicle was operated by the user of the plurality of users when in the operation state 504 — Determine a location of the micro-mobility vehicle while the micro-mobility vehicle is in the parked state 506 — Evaluate whether it is permissible to transition the micro-mobility vehicle to the parked state at the location 508 — Responsive to determining that it is not permissible to transition to the parked state at the location, update a profile of the user to indicate non-compliance use of the micro-mobility vehicle

(51) Int. Cl.
    *G06Q 30/018*    (2023.01)
    *H04W 4/48*     (2018.01)
    *G01S 19/45*    (2010.01)

(58) Field of Classification Search
    USPC .................................................. 705/13, 1.1
    See application file for complete search history.

(56)           References Cited

FOREIGN PATENT DOCUMENTS

| | | | | | |
|---|---|---|---|---|---|
| CA | 2984955 | C | * | 8/2023 | ............ G06F 16/00 |
| CN | 109711388 | A | * | 5/2019 | |
| CN | 108810804 | B | * | 6/2020 | ............... B60R 1/00 |
| CN | 113320526 | A | * | 8/2021 | ........... B60W 30/06 |
| JP | 2004227145 | A | * | 8/2004 | .......... B60R 25/042 |
| JP | 3775200 | B2 | * | 5/2006 | |
| TW | 201732500 | A | * | 9/2017 | ............ B60K 35/00 |
| WO | WO 2014159873 | A | * | 10/2014 | ........ H04M 1/72412 |
| WO | WO-2020105872 | A1 | * | 5/2020 | ............ B60K 35/00 |

\* cited by examiner

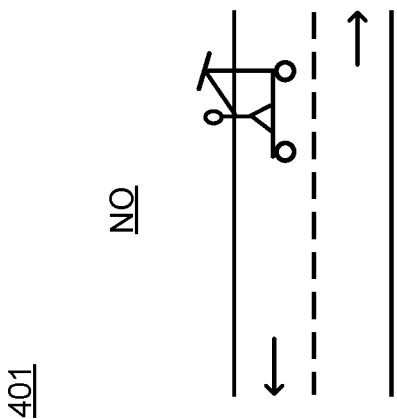
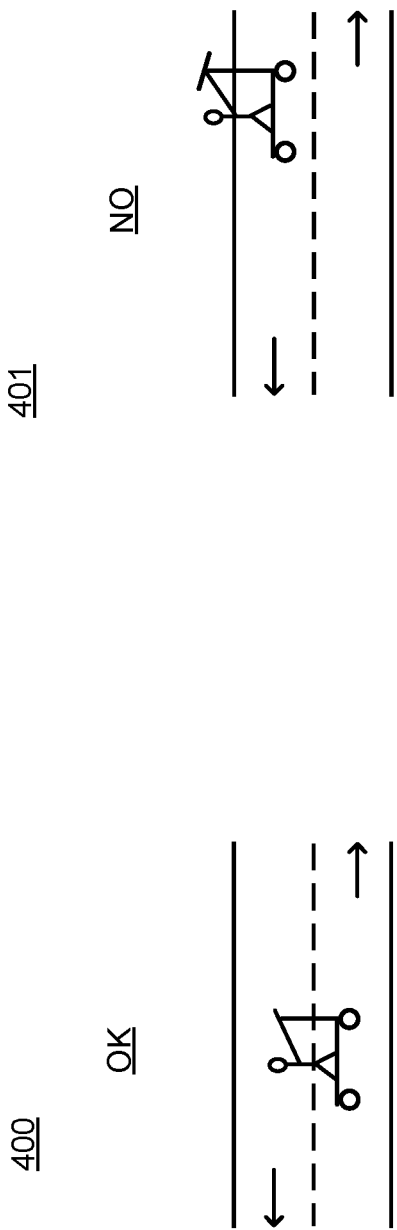

MICRO-MOBILITY VEHICLE STATUS COMPLIANCE DETERMINATION

TECHNICAL FIELD

The present disclosure relates to micro-mobility vehicles and in particular to determining whether a state of a micro-mobility device is in compliance with a rule.

BACKGROUND

Micro-mobility vehicles, such as bicycles and electronic scooters, are now commonly shared by riders, where each rider may check in and check out a micro-mobility vehicle. While this has led to many advantages, such as lowered carbon footprint and freed up storage space in users' home, it has also led to many disadvantages, such as riders littering streets with illegally parked shared mobility vehicles, and riders disobeying laws and regulations (e.g., by riding on sidewalks where doing so is prohibited). Existing technology-based enforcement mechanisms are ill-equipped to determine when use of a shared micro-mobility vehicle is non-compliant with a rule. For example, global positioning systems (GPS) used on shared micro-mobility vehicles are generally accurate only to around three meters, and this lack of accuracy grows when users are in "urban canyons" where tall buildings obscure GPS signals and render location measurement capabilities inaccurate by up to several city blocks. Precision on this order is insufficient for determining whether a micro-mobility vehicle is compliant with a law, in that a yard, or even an inch, could be the difference between being compliant or not for such a small vehicle.

SUMMARY

Systems and methods are disclosed herein for detecting non-compliant use of a micro-mobility vehicle in several embodiments, including a parked vehicle environment and in an environment where a micro-mobility vehicle is in motion. In an embodiment, a micro-mobility service detects that a micro-mobility vehicle shared by a plurality of users has transitioned from an operational state to a parked state, where the micro-mobility vehicle was operated by a user of the plurality of users when in the operational state. The micro-mobility service determines a location of the micro-mobility vehicle while the micro-mobility vehicle is in the parked state, and evaluates whether it is permissible to transition the micro-mobility vehicle to the parked state at the location. Responsive to determining that it is not permissible to transition to the parked state at the location, the micro-mobility service updates a profile of the user to indicate non-compliant use of the micro-mobility vehicle.

BRIEF DESCRIPTION OF THE DRAWINGS

FIGS. 4A and 4B include an illustration of complaint and non-compliant movement of a micro-mobility vehicle, according to one embodiment.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
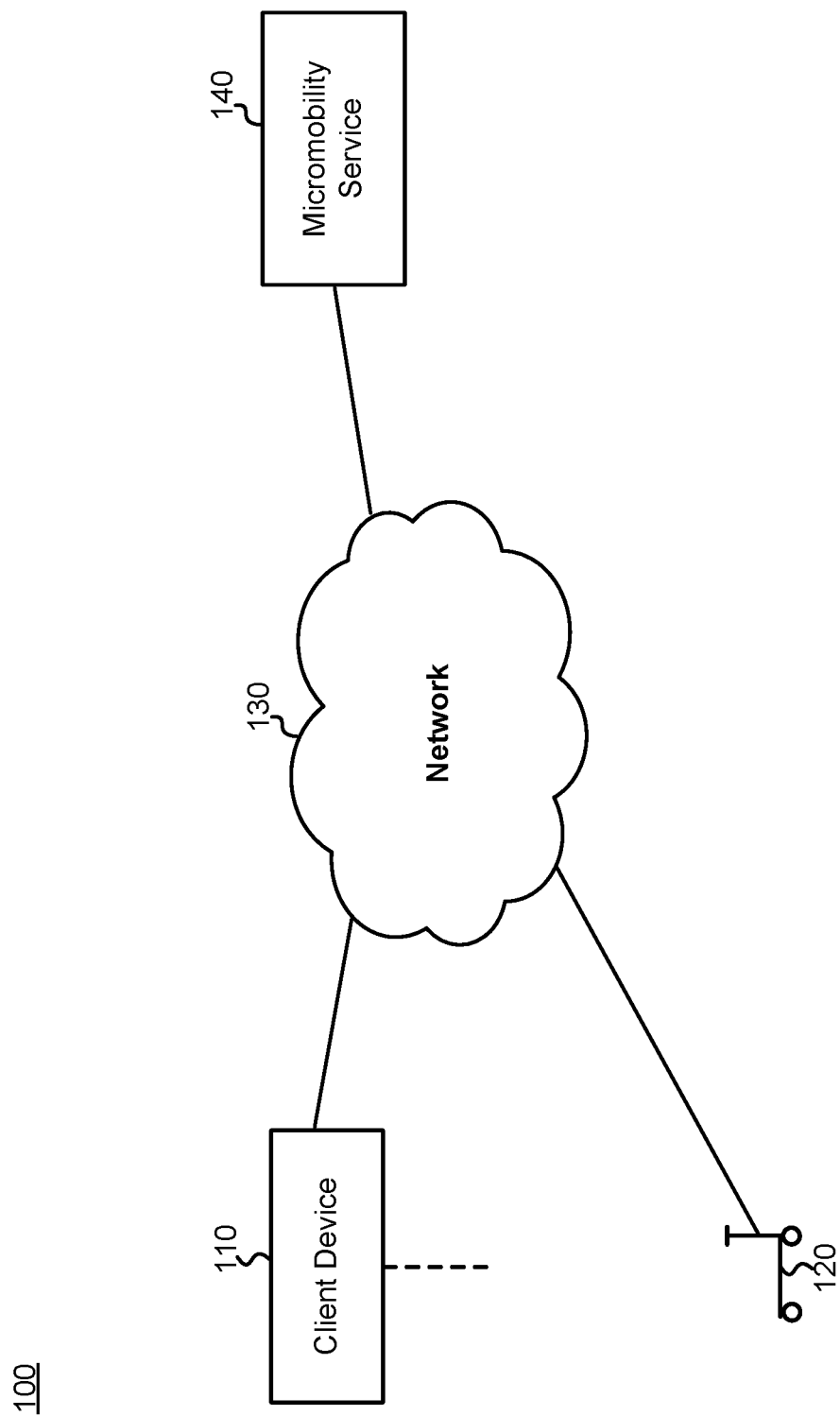
FIG. 1 is a block diagram illustrating an environment in which a micro-mobility service operates, according to one embodiment.

FIG. 1 is a block diagram illustrating an environment in which a micro-mobility service operates, according to one embodiment. System 100 includes client device 110, micro-mobility vehicle 120, network 130, and micro-mobility service 140. Client device 110 may be a mobile device of a user (e.g., a mobile phone, a tablet, a wearable device such as a smart watch that is configured to access a data network, and the like). Alternatively, client device 110 may be integrated into micro-mobility vehicle 120, where a user may log into a shared interface of micro-mobility vehicle 120 through any known login means (e.g., username and password; facial recognition; voice recognition; etc.). Client device 110 executes an application, such as a micro-mobility vehicle sharing application where a rider may request to transition a micro-mobility vehicle (e.g., micro-mobility vehicle 120) from a parked state to an operational state. The application may include some or all functionality of micro-mobility service 140.

Micro-mobility vehicle 120 may be any shared vehicle that is designed for single-occupancy or multiple-occupancy use. Micro-mobility vehicle 120 is smaller than a car, and is typically man-powered or electric-powered. Examples of micro-mobility vehicles include bicycles (including electric-powered variants), scooters (including electric-powered variants), one-, two-, three-, or four-wheeled platforms (e.g., electric-powered unicycles, hoverboards, segways, electronic skateboards, and the like), and any other small-scale vehicle designed for shared use across a plurality of users. Micro-mobility vehicle 120 may include client device 110. Micro-mobility vehicle 120 may include a mount for holding client device 110 (e.g. on handlebars of a scooter or bicycle). Where micro-mobility vehicle 120 includes client device 110, micro-mobility vehicle 120 includes any and all components and functionality of client device 110 (e.g., camera, user interface, etc.).

Client device 110 and micro-mobility vehicle 120 are configured to communicate with micro-mobility service 140, and in some embodiments, each other, over network 130. Network 130 may be any data network, such as the Internet, a short-range communications network (e.g., a BLUETOOTH signal), and the like. Micro-mobility service 140 facilitates transitioning micro-mobility scooter 120 from a parked state to an operational state, and vice versa. As used herein, the term "parked state" refers to a state of the vehicle where no rider has checked out the vehicle. While in the parked state, micro-mobility vehicle 120 may have its wheels locked. Movement may be detected while in the parked state, either by micro-mobility service 140, or by micro-mobility vehicle 120. Micro-mobility service 140 may detect movement by way of a location signal, by detecting changes in imagery from a camera, through a wheel encoder that detects rotation of the wheels, and the like. Micro-mobility vehicle 120 may detect movement by any sensor, such as an accelerometer, or by any means discussed with respect to micro-mobility service 140. Where movement is detected while in the parked state, remedial action may occur. For example, micro-mobility service 140 may instruct micro-mobility vehicle 120 to sound output an alert (e.g., either visually or using audio speakers) to deter further movement. As other examples, micro-mobility service 140 may alert authorities or employees to locate and repossess the vehicle. As used herein, the term "operational state" refers to a state of the vehicle where a rider has checked out the vehicle. In addition to facilitating transitioning between states, micro-mobility service 140 ensures compliance with various rules while a user is operating micro-mobility vehicle 120, or transitioning between states of the micro-mobility vehicle 120. Further details relating to the operation of micro-mobility service 140 are described below.

Micro-Mobility Service

Figure 2:
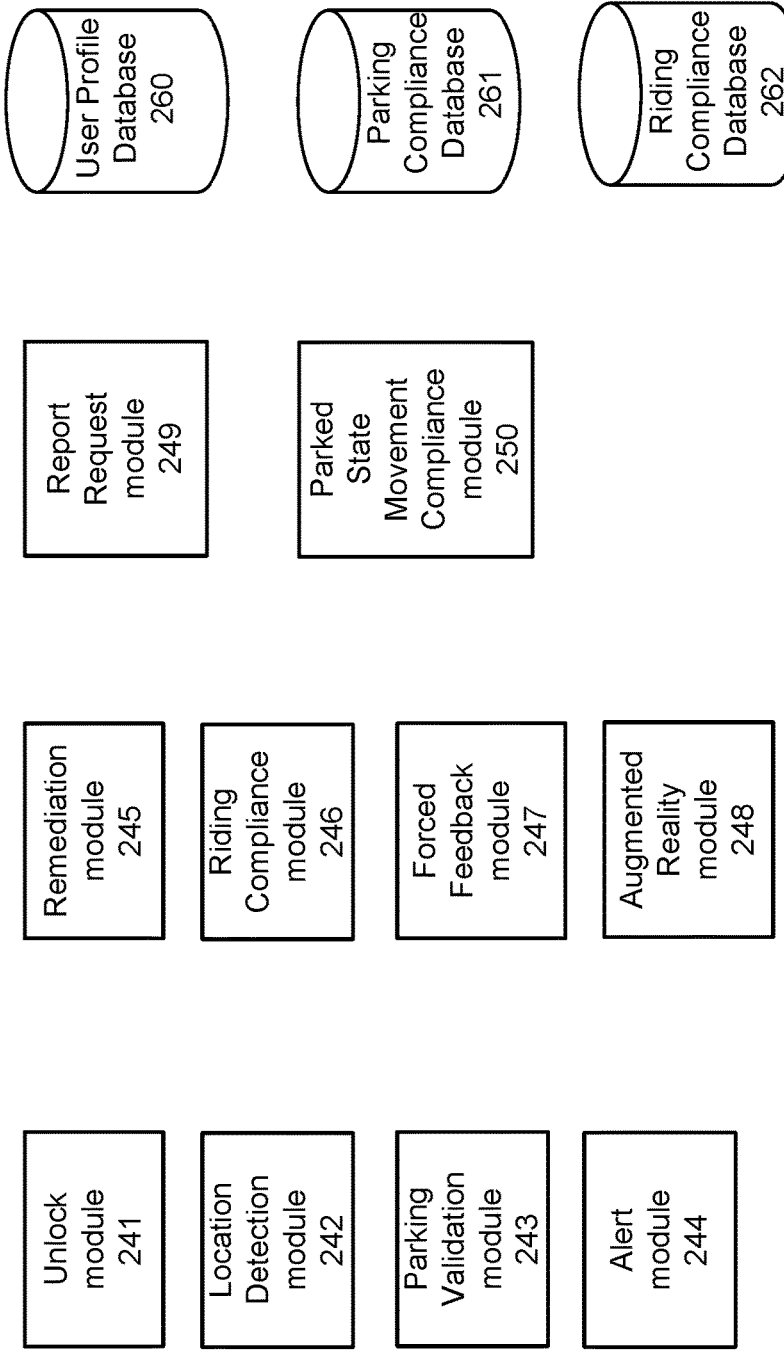
FIG. 2 is a block diagram including modules and databases that may be used by a micro-mobility service, according to one embodiment.

FIG. 2 is a block diagram including modules and databases that may be used by a micro-mobility service, according to one embodiment. Micro-mobility service 140 is depicted as including various modules, such as unlock module 241, location detection module 242, parking validation module 243, alert module 244, remediation module 245, riding compliance module 246, forced feedback module 247, augmented reality module 248, repark request module 249, and parked state movement compliance module 250. Micro-mobility service 140 is also depicted as including various databases, such as user profile database 260, parking compliance database 261, and riding compliance database 262. The modules and databases depicted in micro-mobility service 140 are merely exemplary; more or fewer modules and databases may be used to achieve the functionality described herein. The functionality of the modules may be self-contained within the servers hosting micro-mobility service 140, or may be in part or in full installed at, and executed by an application installed on client device 110.

Unlock module 241 transitions micro-mobility vehicle 120 from a parked state to an operational state. Unlock module 241 receives credentials from an application of client device 110 that identify a user of client device 110. Unlock module 241 determines, responsive to receiving a request from client device 110 to unlock micro-mobility vehicle 120, whether to transition the vehicle from the parked state to the operational state. When unlock module 241 determines to transition the vehicle from the parked state to the operational state, unlock module 241 commands micro-mobility vehicle 120 to disengage a lock that prevents operation of micro-mobility vehicle 120, and records that the user of client device 110 is operating micro-mobility vehicle 120.

Location detection module 242 detects the location of micro-mobility vehicle 242. In an embodiment, location detection module 242 executes when a user is attempting to transition micro-mobility vehicle 120 from an operational state into a parked state. This is to ensure that micro-mobility vehicle 242 is being parked at a permissible parking location (e.g., in a designated parking zone, rather than on a sidewalk or in the middle of a road, which may cause a nuisance to pedestrians or drivers). In another embodiment, location detection module 242 executes periodically, or aperiodically, over intervals of time. This may ensure that micro-mobility vehicle 242 is being operated in permissible locations (e.g., on a bike lane, rather than a sidewalk where riding is prohibited), or that micro-mobility vehicle 242 is not being stolen (e.g., based on the location moving while micro-mobility vehicle 242 is in a parked state).

In order to determine the location of micro-mobility vehicle 120, in an embodiment, location detection module 242 simply queries client device 110 for the location of micro-mobility vehicle 120 when executing (e.g., queries for GPS data or location data). In an embodiment, location detection module 242 processes information from client device 110 to determine the location of micro-mobility vehicle 120. For example, location detection module 242 receives one or more images from a camera of client device 110, and compares the images to images in a database, where the databased images are mapped to a known location. Upon finding a match, location detection module 242 determines that the location of micro-mobility vehicle 120 is the location mapped to the matching image in the database. Using images (in isolation, or in conjunction with using GPS readings) to perform location analysis results in a more precise location determination. For example, standard GPS readings may only be accurate to a certain degree (e.g., within 3 meters), where permissible and impermissible use of micro-mobility vehicles may be separated by a much smaller degree (e.g., a matter of centimeters). Use of images may help pinpoint location of a micro-mobility vehicle. After location is detected, location detection module 242 may pass the location to other modules of micro-mobility service 140. Rather than perform image comparisons for improving location, location detection module 242 may translate the image to a rendering of the image, and compare data points of the rendering to a two- or three-dimensional model to determine where, on the model, the rendering matches to. The match point may be mapped to a real-world location (e.g., by GPS coordinates), and that location may be used to determine the location of micro-mobility vehicle 120.

Parking validation module 243 determines whether micro-mobility vehicle 120 is being transitioned to a parked state from an operational state in a valid location. Parking validation module 243 executes responsive to an attempt by client device 110 to transition micro-mobility from to a parked state from an operational state. In an embodiment, parking validation module 243 receives the location of micro-mobility vehicle 120 from location detection module 242 and accesses parking compliance database 261 to determine whether the location of micro-mobility vehicle 120 is permissible. Parking compliance database 261 includes locations (e.g., coordinates, or pictures that correspond to locations) that are mapped to indicia of whether parking is permissible at that location. Parking validation module 243 queries parking compliance database 261 with the location of micro-mobility vehicle 120 and receives a response to the query indicating whether parking is permissible at that location. In an embodiment, other data may be collected from micro-mobility vehicle 120 and/or client device 110, such as coordinates via GPS, orientation of the vehicle relative to ground by way of an accelerometer, orientation of the vehicle relative to compass direction via magnetometer, position with respect to surrounding features as captured by images from one or more cameras or other sensors, and the like. Parking validation module 243 may compare this other information to information in parking compliance database 261 to determine whether the location of micro-mobility vehicle 120 is permissible.

In an embodiment, parking compliance database may include a machine learning model trained to take an image as input, and perhaps other information (e.g., location information, local regulations, and any other parameter). The image may be an image of micro-mobility vehicle 120, or an image captured by a camera mounted on micro-mobility vehicle 120. For example, images of micro-mobility vehicle 120 may directly show where and how micro-mobility vehicle 120 is parked, which may correlate to whether the parking is valid. As another example, images captured by a camera mounted on micro-mobility vehicle 120 may show the environment surrounding micro-mobility vehicle 120, which may inform whether the parking is valid. The machine learning model may output whether the image shows a validly parked micro-mobility vehicle or not. In an embodiment, the machine learning model is trained using supervised learning. The training may be performed using a data set including labeled imagery (e.g., labeled manually or automatically as showing a validly or in-validly parked micro-mobility vehicle). For example, an administrator, or a user of a micro-mobility vehicle, may transmit a photograph of a micro-mobility vehicle to a training database. A human being may, based on a set of rules, manually label the image as showing a validly parked vehicle, or not showing a validly parked vehicle. Additional training data may be generated by a processor, which may generate minor variants of what is depicted in the image and may apply a label that corresponds to what was manually labeled in a seed image.

In an embodiment, the machine learning model is trained to output non-binary outputs. Any relevant label set may be used to train the machine learning model. For example, the machine learning model may be trained to output whether the image includes a micro-mobility vehicle at all, whether the micro-mobility vehicle is parked next to a known entity (e.g., a bicycle rack, a docking station, a tree), whether the micro-mobility vehicle is parked in a designated zone (e.g., a zone where pavement is painted to indicate a permissible parking location), whether the micro-mobility vehicle is parked in or near a pedestrian pathway, whether it is unknown whether the micro-mobility vehicle is parked validly (e.g., due to not matching any data in the training set), and so on. Multiple outputs, such as degrees of matching, may be output as well. For example, the machine learning model may be trained to not just output not just that the micro-mobility vehicle is parked impermissibly on a pedestrian pathway, but may additionally be trained to output the degree to which this is the case (e.g., fully on the pathway, mostly on the pathway, mostly off the pathway, fully off the pathway, etc.). In an embodiment, the machine learning model may be trained to output a bounding box around the micro-mobility vehicle. In another embodiment, joint training to regress the bounding box as well as image label(s) can improve the labeling accuracy by focusing some layers of the network to the bounding box area.

In an embodiment, a plurality of machine learning models may be trained, each set being trained using a different set of training data. For example, different regions may have different regulations regarding what is or is not permissible, may have different looking stations (e.g., docking station versus rack), and so on. Thus, a different machine learning model may be trained for each different region. Moreover, different machine learning models may be trained for different categories of micro-mobility vehicles. For example, regulations surrounding bicycle parking may be different than regulations surrounding scooter parking, and thus different machine learning models may be trained for bicycles and scooters.

Alert module 244 outputs an alert when parking validation module 243 indicates that parking is impermissible at a location where parking was attempted. Alert module 244 outputs an alert to the rider indicating to the rider that micro-mobility vehicle 120 is impermissibly parked. In an embodiment, alert module 244 outputs the alert to client device 110 (e.g., via the application executing on client device 110). The alert may be a push notification, an audio notification, a call, a text message, an email, or any other type of alert including content that indicates that micro-mobility vehicle 120 is improperly parked. Alternatively, or additionally, alert module 244 may cause an alert to occur at mobile device 120. For example, alert module 244 may command a horn or other audio or visual interface to output an indication that micro-mobility vehicle 120 is impermissibly parked. In an embodiment, alert module 244 indicates to the user that micro-mobility vehicle 120 will not be transitioned from the operational state to a parked state due to the impermissible parking location. In such a scenario, should the user walk away from micro-mobility vehicle 120, the user may be penalized and may remain responsible for micro-mobility vehicle 120 until such a time that micro-mobility vehicle 120 is moved to a permissible location for parking (e.g., by a good Samaritan, by another user of micro-mobility service 140, etc., as will be described with reference to repark request module 249). Alert module 244 may determine whether the user reparks the vehicle in a permissible location based on the alert. Alert module 244 may log an indication in user profile database 260 that the user did, or did not, repark micro-mobility vehicle 120 in a permissible location following the alert. Alert module 244 may conclude that the user did not re-park micro-mobility vehicle 120 responsive to detecting that client device 110 of the user has traveled a threshold distance from micro-mobility vehicle 120.

User profile database 260 includes a profile of users of micro-mobility service 140. The profiles of the users indicate, among other things, instances of non-compliant use of micro-mobility service 140, such as impermissible parking, impermissible riding (to be described below with respect to riding compliance module 246), and other instances of detected bad behavior. Remediation module 245 may determine whether instances of bad behavior, in the aggregate, merit limiting access by a given user to micro-mobility service 140. Limiting access may include completely barring a user from accessing micro-mobility vehicle 120 (e.g., permanently, or for a predefined period of time), reducing the functionality of micro-mobility vehicle 120 (e.g., micro-mobility vehicle 120 is throttled to lower speed during operation by a user found to have bad behavior), and the like. Remediation module 245 thus may deny requests to unlock micro-mobility vehicle 120, or may transmit commands to micro-mobility vehicle 120 to limit its functionality.

Rather than exclusively limiting access, remediation module may impose education, incentives, and penalties. When non-permissible use of the vehicle is detected, remediation module 245 may present content to the user that describes the nature of the non-permissible event and educational information about how to avoid repeating the event in the future. Remediation module 245 may provide incentives or rewards, be them monetary or non-monetary, for completing a trip without conducting non-permissible events. For example, a credit may be given for a free ride that only entails permissible use, and penalties may be imposed where non-permissible events occur during a trip, such as improper parking. Remediation module 245 may retrieve educational content from a database that is indexed what impermissible event has been detected.

Remediation module 245 may transmit a notification to client device 110 indicating any imposed limitation. Remediation module 245 may also transmit a notification to client device 110 indicating that some or all imposed limitations may be removed for the user if the user engages in a remediation session. A remediation session, as defined herein, may be any activity imposed by remediation module 245 that, if completed, will result in removal of an imposed limitation. For example, a remediation session may include the reading of materials, or viewing of a video, that explains regulations on parking and/or riding, and may also (or alternatively include) a quiz on the same, where answering a sufficient amount of questions on the quiz successfully results in the removal of some or all imposed limitations.

Turning for the moment away from parking scenarios, and toward riding scenarios, riding compliance module 246 determines, while micro-mobility vehicle 120 is in an operational state, whether micro-mobility vehicle 120 is being operated in compliance with rules. Compliance may be determined based on any number or combination of factors, such as location of micro-mobility vehicle 120, direction in which micro-mobility vehicle 120 is heading, speed of micro-mobility vehicle 120, number of riders on micro-mobility vehicle 120, features surrounding micro-mobility vehicle 120 (e.g., pedestrians, obstacles, other vehicles), and the like. In order to determine compliance, riding compliance module 246 may transmit a query to riding compliance database 262, the query including the current status of micro-mobility vehicle 120 (e.g., speed, direction, location, orientation of the vehicle relative to ground, position with respect to surrounding features, any other status information described herein, etc.), and may receive a result of whether that status is compliant or not based on an entry that maps that state to a compliant state or a non-compliant state. In an embodiment, the query may also include an image, and the status and/or the image may be input into a machine learning model trained to output whether the status is compliant. The machine learning model may be trained in a manner similar to that described above with respect to the parking scenario, except that the labeling applied in the training data is labeled with respect to riding compliance. Both compliant use and non-compliant use may be logged in user profile database 260.

Riding compliance module 246 may determine whether a user is inexperienced or experienced based on their profile in user profile database 260. In order to train compliance for a novice user, riding compliance module 246 may command micro-mobility vehicle 120 to artificially limit its capabilities (e.g., throttle speed, only ride for a shortened period of time, limit rides to certain locations, etc.). As riding compliance module 246 determines that the profile of the user indicates that the user is experienced enough to handle the capabilities that were limited, riding compliance module 246 may remove some or all of those limitations.

Forced feedback module 247 may provide feedback to the rider and/or to micro-mobility vehicle 120 based on non-compliant use detected by riding compliance module 246. Forced feedback may be provided visually or through audio output to the user, or may be provided by commanding micro-mobility vehicle 120 to adjust its state. Forced feedback to the user may be an alert that the user is riding non-compliantly, (e.g., too fast, wrong direction, in an impermissible zone such on a sidewalk rated for pedestrians and not for micro-mobility vehicles, etc.). The alert may include the reason why the user is riding non-compliantly, and may include a consequence for continued non-compliant behavior (e.g., the micro-mobility vehicle will transition to a parked state; the user may have limitations imposed, monetary penalties may be imposed etc.). Alternatively, or additionally, forced feedback module 247 may command micro-mobility vehicle 120 to alter its function (e.g., by slowing down or halting, by disengaging its motor, by locking the wheels, or any other activity that was not requested by the rider). Forced feedback module 247 may remove any imposed commands on micro-mobility vehicle 120, and allow it to return to normal operation, if compliant use is again detected (e.g., the user slows to a permissible speed). Forced feedback module 247 may provide feedback where micro-mobility vehicle 120 is in compliance, but is likely heading toward non-compliance (e.g., the heading of micro-mobility vehicle 120 is toward a non-compliant zone; forced feedback module 247 may provide an output to discourage or prevent entry into that zone).

Augmented reality module 248 may overlay compliant and non-compliant use zones for various activities that can be performed with micro-mobility vehicle 120. In the parking context, augmented reality module 248 may overlay, on top of a camera feed of client device 110, indicia of where on the camera feed it is, and is not, permissible to park. For example, a roadway or sidewalk may be colored red, whereas a corner of a plaza may be colored green, with red indicating that parking would be non-compliant, and green indicating that parking would be compliant. Red and green are merely exemplary, any text, coloration, or accentuation may be used to indicate where compliant parking and non-compliant parking zones exist. Augmented reality module 248 may also function in the context where micro-mobility vehicle 120 is not being parked, but is in an operational state. For example, if a user is riding on a path next to a boardwalk where micro-mobility vehicles are prohibited, augmented reality module 248 may overlay on top of a screen with a camera feed from client device 110 a green zone on the path, but a red zone on the boardwalk. Other augmented reality features may be output by augmented reality module 248, beyond compliant/non-compliant scenarios. For example, augmented reality module 248 may include speed overlays and colors (e.g., red/green) to indicate whether micro-mobility vehicle 120 is moving at a permissible speed. As another example, directionality for roadways may be imposed, where arrows may indicate a permissible direction, and colors may be used to indicate whether the micro-mobility vehicle 120 is moving in a permissible direction.

Repark request module 249 may detect that micro-mobility vehicle 120 has been parked in an impermissible location, or has been abandoned in an impermissible location (e.g., where transitioning to a parked state is denied, and the user nonetheless ignores beeps and walks away from micro-mobility vehicle 120). Repark request module 249 may prompt other users of micro-mobility service 140 to move micro-mobility vehicle 120 to a permissible location. Repark request module 249 may identify users in the vicinity of micro-mobility vehicle 120 (e.g., within a predefined radius), and may transmit a prompt to one or more of those users to relocate micro-mobility vehicle 120. Repark request module 249 may include an incentive in the prompt. In an embodiment, the users may be regular riders that use micro-mobility service 140. In an embodiment, the users may be gig workers of micro-mobility service 140, who need not be in the vicinity of micro-mobility vehicle 120 to be prompted. In an embodiment, augmented reality module 248 may work in tandem with repark request module 249. For example, augmented reality module 248 may output a directional arrow pointing toward where micro-mobility vehicle 120 is currently positioned. That arrow may be replaced by another hour indicating to where micro-mobility vehicle 120 should be moved.

Parked state movement compliance module 250 detects that a micro-mobility vehicle in a parked state is nonetheless being moved, and determines whether such movement is compliant. Compliant movement is defined in parking compliance database 261. Examples of compliant movement include detecting that a user authorized to move parked vehicles (e.g., to spread out parked vehicles for easier access by users) is moving the parked vehicle (e.g., by carrying the parked vehicle). Examples of non-compliant movement include the carrying of a parked vehicle to a non-compliant parking location, such as within an office of a user. Parked state movement compliance module 250 may activate alert module 244 responsive to detecting non-compliant movement.

Exemplary Compliant Use of Micro-Mobility Vehicles

Figure 3B:
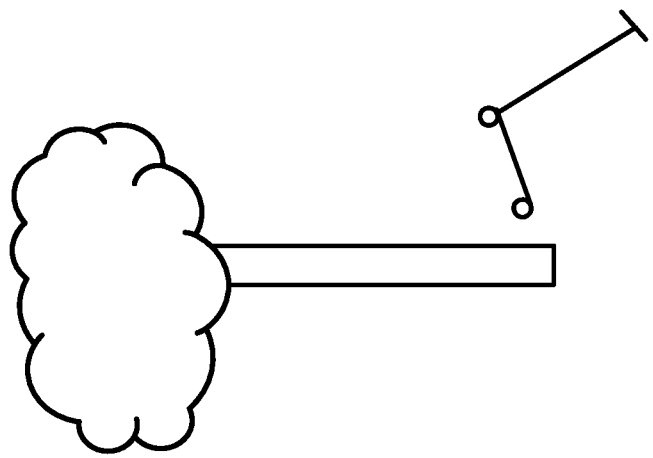
FIGS. 3A and 3B include an illustration of compliant and non-compliant parking positions of a micro-mobility vehicle, according to one embodiment.
Figure 3A:
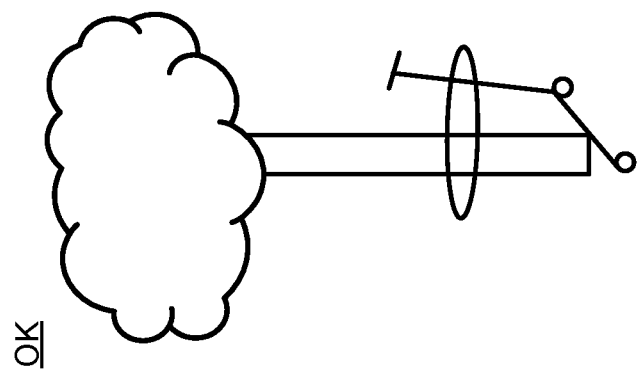

FIGS. 3A and 3B include an illustration of compliant and non-compliant parking positions of a micro-mobility vehicle, according to one embodiment. As depicted in FIG. 3A, environment 300 shows a permissible parking area—against a tree—for a micro-mobility vehicle. As depicted in FIG. 3B, environment 301 shows an impermissible parking area—on the ground, and not against the tree—for a micro-mobility vehicle. Micro-mobility service 140 determines, as described above, that environment 300 includes a permissibly parked micro-mobility vehicle, and environment 301 does not include a permissibly parked micro-mobility vehicle.

FIGS. 4A and 4B include an illustration of complaint and non-compliant movement of a micro-mobility vehicle, according to one embodiment. As depicted in FIG. 4A, environment 400 shows permissible use of a micro-mobility vehicle—namely, riding in a permissible direction. As depicted in FIG. 4B, environment 401 shows an impermissible use of the micro-mobility vehicle—namely, riding in an impermissible direction. Micro-mobility service 140 determines, as described above, that environment 401 includes permissible use, whereas environment 301 includes impermissible use.

Exemplary Data Flow

Figure 5:
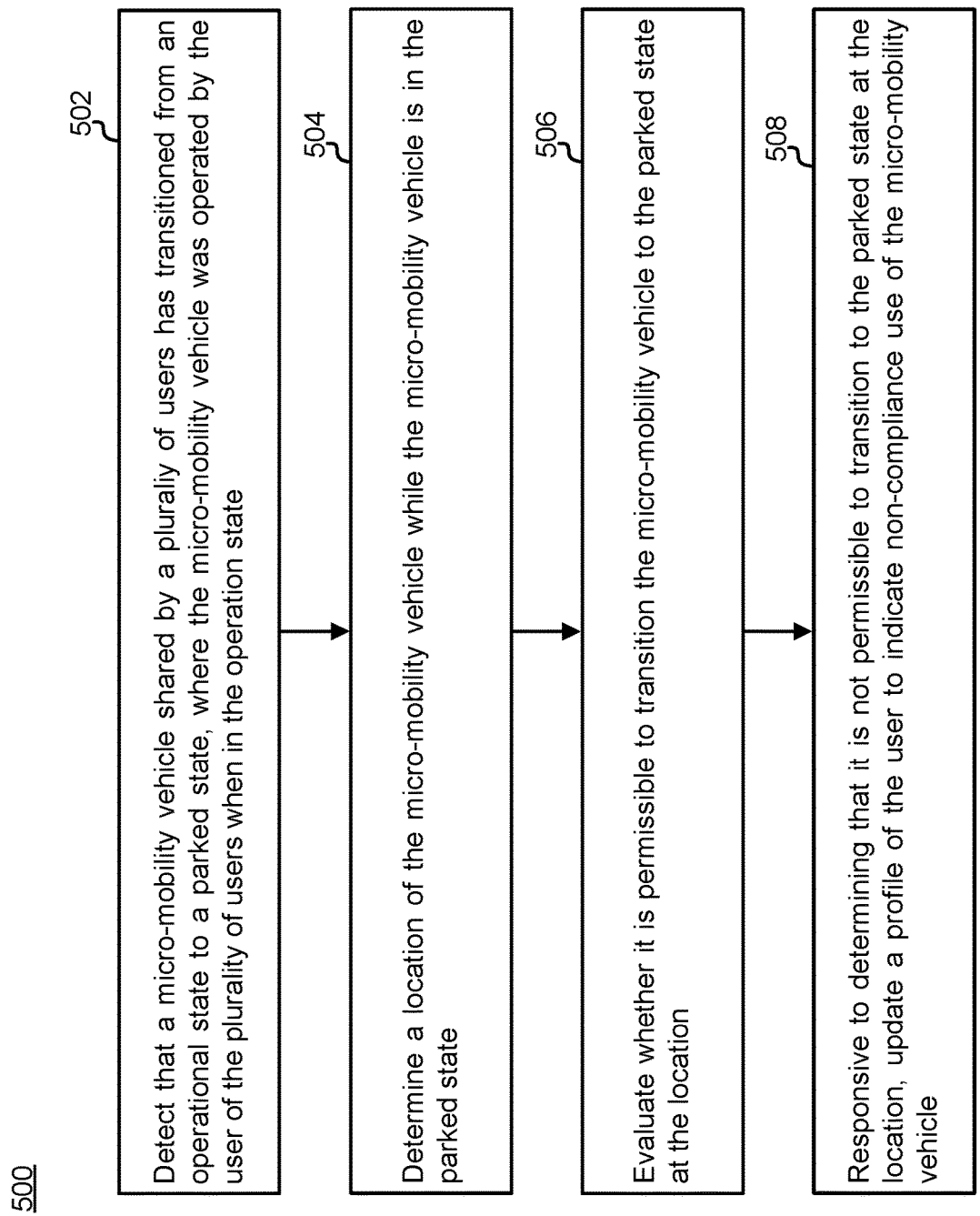
FIG. 5 is a process flow diagram illustrating parking compliance enforcement process, according to one embodiment.

FIG. 5 is a process flow diagram illustrating parking compliance enforcement process, according to one embodiment. Process 500 begins with micro-mobility service 140 detecting 502 that a micro-mobility vehicle (e.g., micro-mobility vehicle 120) shared by a plurality of users has transitioned from an operational state to a parked state, where the micro-mobility vehicle was operated by a user of the plurality of users when in the operational state. Micro-mobility service 140 determines (e.g., using location detection module 242) a location of the micro-mobility vehicle while the micro-mobility vehicle is in the parked state. Micro-mobility service 140 evaluates 506 whether it is permissible to transition the micro-mobility vehicle to the parked state at the location (e.g., using parking validation module 243). Responsive to determining that it is not permissible to transition to the parked state at the location, micro-mobility service 140 updates 508 a profile of the user (e.g., as stored in user profile database 260) to indicate non-compliant use of the micro-mobility vehicle.

Computing Hardware

Figure 6:
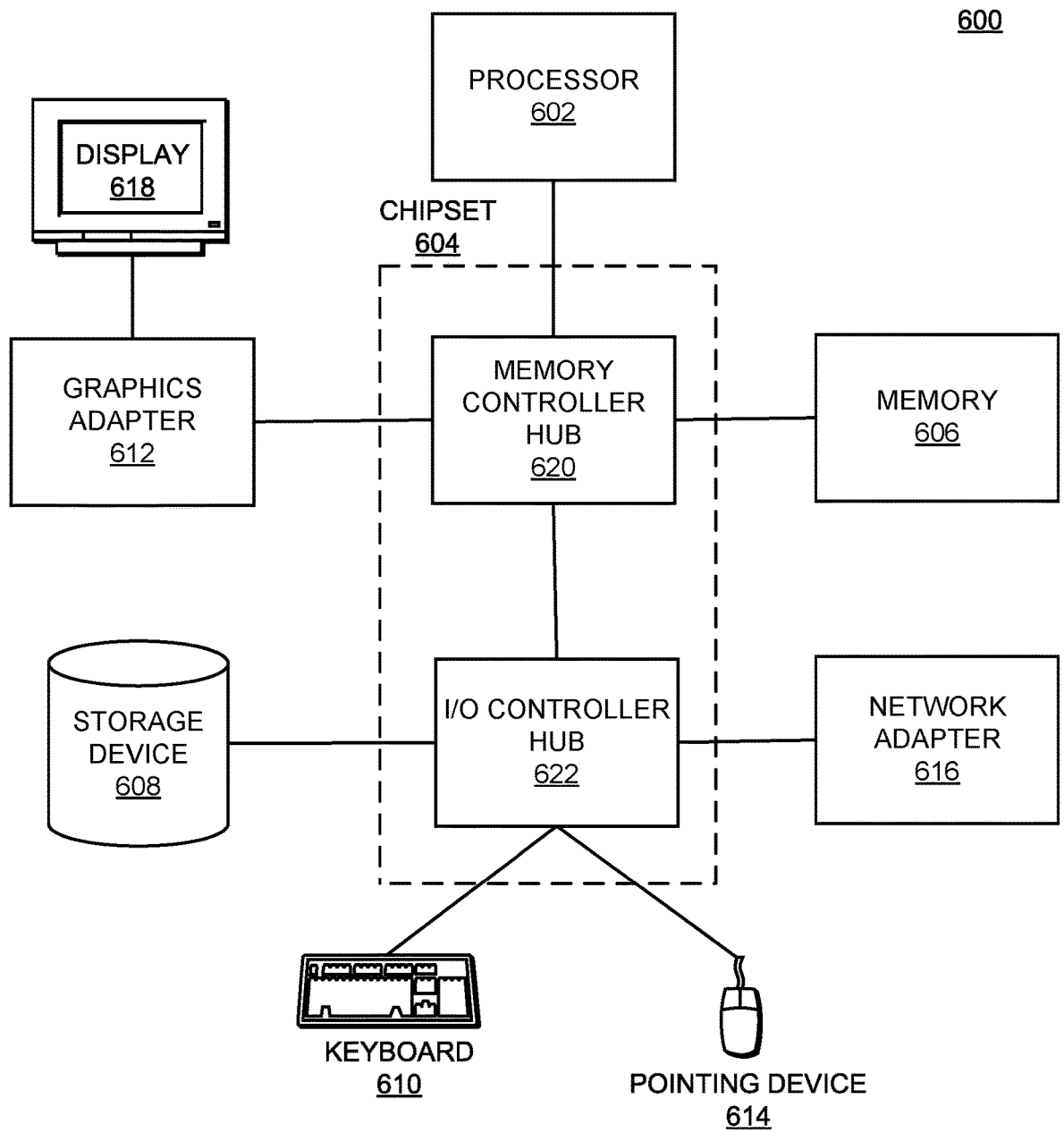
FIG. 6 is a block diagram that illustrates a computer system, according to one embodiment.

The entities shown in FIG. 1 are implemented using one or more computers. FIG. 6 is a block diagram that illustrates a computer system 600 for acting as a client 110 or micro-mobility service 140, according to one embodiment. Illustrated are at least one processor 602 coupled to a chipset 604.

Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to the network 130.

As is known in the art, a computer 600 can have different and/or other components than those shown in FIG. 6. In addition, the computer 600 can lack certain illustrated components. For example, the computer acting as the location determination service 630 can be formed of multiple blade servers linked together into one or more distributed systems and lack components such as keyboards and displays. Moreover, the storage device 608 can be local and/or remote from the computer 600 (such as embodied within a storage area network (SAN)).

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for detecting non-compliant use of a micro-mobility vehicle, the method comprising:
receiving a first request from a user by way of a mobile application to transition a micro-mobility vehicle from a parked state to an operational state, the mobile application installed on a client device;
responsive to receiving the first request, transitioning the micro-mobility vehicle from the parked state to the operational state by instructing the micro-mobility vehicle to disengage a lock that prevents operation of the micro-mobility vehicle, wherein the lock is disengaged while the vehicle is in the operational state;
receiving a second request from the user by way of the mobile application to transition the micro-mobility vehicle from the operational state to the parked state;

responsive to receiving the second request, determining whether it is permissible to transition the micro-mobility vehicle from the operational state to the parked state by:
  receiving, from the client device, a GPS location of the client device;
  receiving, from one or more sensors of the micro-mobility vehicle, an orientation of the micro-mobility vehicle relative to the ground and an orientation of the micro-mobility vehicle relative to a compass direction;
  receiving one or more images from a camera of the client device, the one or more images showing an environment surrounding the micro-mobility vehicle;
  determining a location of the micro-mobility vehicle based on the GPS location of the client device and the one or more images from the camera of the client device, wherein determining the location of the micro-mobility vehicle based on the GPS location of the client device and the one or more images from the camera of the client device comprises comparing the one or more images from the camera of the client device to one or more images in a database, the one or more images in the database mapped to known locations; and
  evaluating whether it is permissible to transition the micro-mobility vehicle to the parked state at the location based on a mapping stored at a parking compliance database that maps locations to indicia of whether parking is permissible at the locations and based on the orientation of the micro-mobility vehicle relative to the ground and the orientation of the micro-mobility vehicle relative to the compass direction; and
responsive to determining that it is not permissible to transition the micro-mobility vehicle from the operational state to the parked state at the location based on the location mapping to an indication that parking is not permissible at the location, updating a profile of the user to indicate non-compliant use of the micro-mobility vehicle and refraining from transitioning the micro-mobility vehicle from the operational state to the parked state by refraining from instructing the micro-mobility vehicle to re-engage the lock.

2. The computer-implemented method of claim 1, further comprising, further responsive to determining that it is not permissible to transition the micro-mobility vehicle from the operational state to the parked state, denying the request to transition from the operational state to the parked state.

3. The computer-implemented method of claim 2, further comprising:
  determining that the user travels a threshold distance from the micro-mobility vehicle without re-locating the vehicle following the denying of the request; and
  responsive to determining that the user travels the threshold distance from the micro-mobility vehicle following the denying of the request, updating the profile of the user to indicate the non-compliant use of the micro-mobility vehicle.

4. The computer-implemented method of claim 1, wherein the method further comprises, further responsive to determining that it is not permissible to transition the micro-mobility vehicle from the operational state to the parked state, outputting an alert to the user, and wherein updating the profile of the user to indicate the non-compliant use of the micro-mobility vehicle comprises performing the updating responsive to detecting a lack of activity of the user responsive to the alert.

5. The computer-implemented method of claim 1, wherein updating the profile of the user to indicate non-compliant use of the micro-mobility vehicle comprises adding a restriction to the user's access to the micro-mobility vehicle.

6. The computer-implemented method of claim 5, further comprising:
  providing a remedial program to the user by way of an application used by the user to operate the micro-mobility vehicle;
  determining that the user successfully completed the remedial program; and
  removing the restriction to the user's access to the micro-mobility vehicle.

7. The computer-implemented method of claim 1, further comprising:
  identifying a nearby user who is in a vicinity of the location; and
  transmitting a request to the nearby user to re-locate the micro-mobility vehicle to a new location at which it is permissible to transition the micro-mobility vehicle from the operational state to the parked state.

8. A non-transitory computer-readable storage medium comprising memory and instructions encoded thereon, the instructions executable by a processor to perform operations for detecting non-compliant use of a micro-mobility vehicle, the instructions comprising instructions to:
  receive a first request from a user by way of a mobile application to transition a micro-mobility vehicle from a parked state to an operational state, the mobile application installed on a client device;
  responsive to receiving the first request, transition the micro-mobility vehicle from the parked state to the operational state by instructing the micro-mobility vehicle to disengage a lock that prevents operation of the micro-mobility vehicle, wherein the lock is disengaged while the vehicle is in the operational state;
  receive a second request from the user by way of the mobile application to transition the micro-mobility vehicle from the operational state to the parked state;
  responsive to receiving the second request, determine whether it is permissible to transition the micro-mobility vehicle from the operational state to the parked state by:
    receiving, from the client device, a GPS location of the client device;
    receiving, from one or more sensors of the micro-mobility vehicle, an orientation of the micro-mobility vehicle relative to the ground and an orientation of the micro-mobility vehicle relative to a compass direction;
    receiving one or more images from a camera of the client device, the one or more images showing an environment surrounding the micro-mobility vehicle;
    determining a location of the micro-mobility vehicle based on the GPS location of the client device and the one or more images from the camera of the client device, wherein determining the location of the micro-mobility vehicle based on the GPS location of the client device and the one or more images from the camera of the client device comprises comparing the one or more images from the camera of the client device to one or more images in a database, the one or more images in the database mapped to known locations; and evaluating whether it is permissible to transition the micro-mobility vehicle to the parked state at the location based on a mapping stored at a parking compliance database that maps locations to indicia of whether parking is permissible at the locations and based on the orientation of the micro-mobility vehicle relative to the ground and the orientation of the micro-mobility vehicle relative to the compass direction; and responsive to determining that it is not permissible to transition the micro-mobility vehicle from the operational state to the parked state at the location based on the location mapping to an indication that parking is not permissible at the location, update a profile of the user to indicate non-compliant use of the micro-mobility vehicle and refrain from transitioning the micro-mobility vehicle from the operational state to the parked state by refraining from instructing the micro-mobility vehicle to re-engage the lock.

9. The non-transitory computer-readable storage medium of claim 8, wherein the instructions further comprise instructions to, further responsive to determining that it is not permissible to transition the micro-mobility vehicle from the operational state to the parked state, deny the request to transition from the operational state to the parked state.

10. The non-transitory computer-readable storage medium of claim 9, wherein the instructions further comprise instructions to:

determine that the user travels a threshold distance from the micro-mobility vehicle without re-locating the vehicle following the denying of the request; and responsive to determining that the user travels the threshold distance from the micro-mobility vehicle following the denying of the request, update the profile of the user to indicate the non-compliant use of the micro-mobility vehicle.

11. The non-transitory computer-readable storage medium of claim 8, wherein the instructions further comprise instructions to, further responsive to determining that it is not permissible to transition the micro-mobility vehicle from the operational state to the parked state, output an alert to the user, and wherein the instructions to update the profile of the user to indicate the non-compliant use of the micro-mobility vehicle comprise instructions to perform the updating responsive to detecting a lack of activity of the user responsive to the alert.

12. The non-transitory computer-readable storage medium of claim 8, wherein the instructions to update the profile of the user to indicate non-compliant use of the micro-mobility vehicle comprise instructions to add a restriction to the user's access to the micro-mobility vehicle.

13. The non-transitory computer-readable storage medium of claim 12, wherein the instructions further comprise instructions to:

provide a remedial program to the user by way of an application used by the user to operate the micro-mobility vehicle;

determine that the user successfully completed the remedial program; and remove the restriction to the user's access to the micro-mobility vehicle.

14. The non-transitory computer-readable storage medium of claim 13, wherein the instructions further comprise instructions to:

identify a nearby user who is in a vicinity of the location; and transmit a request to the nearby user to re-locate the micro-mobility vehicle to a new location at which it is permissible to transition the micro-mobility vehicle from the operational state to the parked state.

15. A system, comprising:

a processor for executing computer program instructions; and a non-transitory computer-readable storage medium comprising memory with instructions stored thereon, the instructions executable by the processor to perform operations for detecting non-compliant use of a micro-mobility vehicle, the operations comprising:

receiving a first request from a user by way of a mobile application to transition a micro-mobility vehicle from a parked state to an operational state, the mobile application installed on a client device;

responsive to receiving the first request, transitioning the micro-mobility vehicle from the parked state to the operational state by instructing the micro-mobility vehicle to disengage a lock that prevents operation of the micro-mobility vehicle, wherein the lock is disengaged while the vehicle is in the operational state;

receiving a second request from the user by way of the mobile application to transition the micro-mobility vehicle from the operational state to the parked state;

responsive to receiving the second request, determining whether it is permissible to transition the micro-mobility vehicle from the operational state to the parked state by:

receiving, from the client device, a GPS location of the client device;

receiving, from one or more sensors of the micro-mobility vehicle, an orientation of the micro-mobility vehicle relative to the ground and an orientation of the micro-mobility vehicle relative to a compass direction;

receiving one or more images from a camera of the client device, the one or more images showing an environment surrounding the micro-mobility vehicle;

determining a location of the micro-mobility vehicle based on the GPS location of the client device and the one or more images from the camera of the client device, wherein determining the location of the micro-mobility vehicle based on the GPS location of the client device and the one or more images from the camera of the client device comprises comparing the one or more images from the camera of the client device to one or more images in a database, the one or more images in the database mapped to known locations; and evaluating whether it is permissible to transition the micro-mobility vehicle to the parked state at the location based on a mapping stored at a parking compliance database that maps locations to indicia of whether parking is permissible at the locations and based on the orientation of the micro-mobility vehicle relative to the ground and the orientation of the micro-mobility vehicle relative to the compass direction; and responsive to determining that it is not permissible to transition the micro-mobility vehicle from the operational state to the parked state at the location based on the location mapping to an indication that parking is not permissible at the location, updating a profile of the user to indicate non-compliant use of the micro-mobility vehicle and refraining from transitioning the micro-mobility vehicle from the operational state to the parked state by refraining from instructing the micro-mobility vehicle to re-engage the lock.

16. The system of claim 15, the operations further comprising, further responsive to determining that it is not permissible to transition the micro-mobility vehicle from the operational state to the parked state, denying the request to transition from the operational state to the parked state.

17. The system of claim 16, the operations further comprising:
   determining that the user travels a threshold distance from the micro-mobility vehicle without re-locating the vehicle following the denying of the request; and
   responsive to determining that the user travels the threshold distance from the micro-mobility vehicle following the denying of the request, updating the profile of the user to indicate the non-compliant use of the micro-mobility vehicle.

18. The computer-implemented method of claim 1, wherein evaluating whether it is permissible to transition the micro-mobility vehicle to the parked state at the location comprises:
   inputting the one or more images from the camera of the client device into a machine learning model; and
   receiving, as output from the machine learning model, an indication of whether it is permissible to transition the micro-mobility vehicle to the parked state at the location.

19. The non-transitory computer-readable storage medium of claim 8, wherein the instructions to evaluate whether it is permissible to transition the micro-mobility vehicle to the parked state at the location comprise instructions to:
   input the one or more images from the camera of the client device into a machine learning model; and
   receive, as output from the machine learning model, an indication of whether it is permissible to transition the micro-mobility vehicle to the parked state at the location.

20. The system of claim 15, wherein the operation for evaluating whether it is permissible to transition the micro-mobility vehicle to the parked state at the location comprise operations for:
   inputting the one or more images from the camera of the client device into a machine learning model; and
   receiving, as output from the machine learning model, an indication of whether it is permissible to transition the micro-mobility vehicle to the parked state at the location.

* * * * *